United States Patent [19]

Müller et al.

[11] Patent Number: 4,817,470

[45] Date of Patent: Apr. 4, 1989

[54] GEAR-SHIFT MECHANISM FOR MOTOR-VEHICLE MULTI-STEP TRANSMISSIONS WITH INTERRUPTION OF TRACTION

[75] Inventors: Erich Müller, Cappel; Edmund Volkert, Neckarsulm; Wolfgang Rienecker, Herzogenaurach, all of Fed. Rep. of Germany

[73] Assignee: ZWN Zahnradwerk Neuenstein GmbH & Co., Fed. Rep. of Germany

[21] Appl. No.: 189,956

[22] Filed: May 3, 1988

Related U.S. Application Data

[63] Continuation of Ser. No. 879,986, Jun. 30, 1986, abandoned.

[51] Int. Cl.$^4$ ............................................. B60K 41/06
[52] U.S. Cl. ........................................ 74/866; 74/339
[58] Field of Search ................ 74/339, 363, 365, 375, 74/866; 192/84 P

[56] References Cited

U.S. PATENT DOCUMENTS

| | | | |
|---|---|---|---|
| 3,732,755 | 5/1973 | Berg et al. | 74/365 X |
| 3,805,640 | 4/1974 | Schneider et al. | 74/365 X |
| 3,808,738 | 5/1974 | Siebers et al. | 74/339 |
| 3,834,499 | 9/1974 | Candellero et al. | 74/339 X |
| 3,910,131 | 10/1975 | Richards | 74/339 X |
| 3,915,271 | 10/1975 | Harper | 192/84 P X |
| 4,493,228 | 1/1985 | Vukovich et al. | 74/866 X |
| 4,527,678 | 7/1985 | Pierce et al. | 74/866 X |
| 4,564,906 | 1/1986 | Stephan et al. | 74/866 X |
| 4,621,545 | 11/1986 | Mohl | 74/866 |
| 4,649,775 | 3/1987 | Ootani | 74/866 |

FOREIGN PATENT DOCUMENTS

| | | |
|---|---|---|
| 0001298 | 6/1978 | European Pat. Off. |
| 0046845 | 5/1981 | European Pat. Off. |
| 931150 | 5/1954 | Fed. Rep. of Germany |
| 1941445 | 8/1969 | Fed. Rep. of Germany |
| 2033314 | 7/1970 | Fed. Rep. of Germany |
| 50258 | 3/1984 | Japan ................................ 74/339 |
| 1276554 | 8/1969 | United Kingdom |
| 2097076 | 1/1979 | United Kingdom |

OTHER PUBLICATIONS automatik, Jan. 1972, No. 1, Herbert Hoffman: Die digitale Winkelgleichlaufregelung in der Antriebstechnik

*Primary Examiner*—Leslie A. Braun
*Assistant Examiner*—Dwight G. Diehl
*Attorney, Agent, or Firm*—Kokjer, Kircher, Bradley, Wharton, Bowman & Johnson

[57] ABSTRACT

A gear-shift mechanism for motor-vehicle multi-step transmissions with interruption of traction is designed in the manner of a semi-automatic transmission. Manual control switched 80, 81 connected to a control unit 82 serve to actuate shift forks via servo systems 90. Sensors coact with rotating marks on the power take-off shaft and with marks on the speed gears which are driven by the drive shaft. The relative phase position $\phi$ between the speed gears and the gearshift sleeves driven by the power take-off shaft is determined by a phase detector 75. When a pre-determined phase position is reached, these elements are brought into engagement with each other.

4 Claims, 3 Drawing Sheets

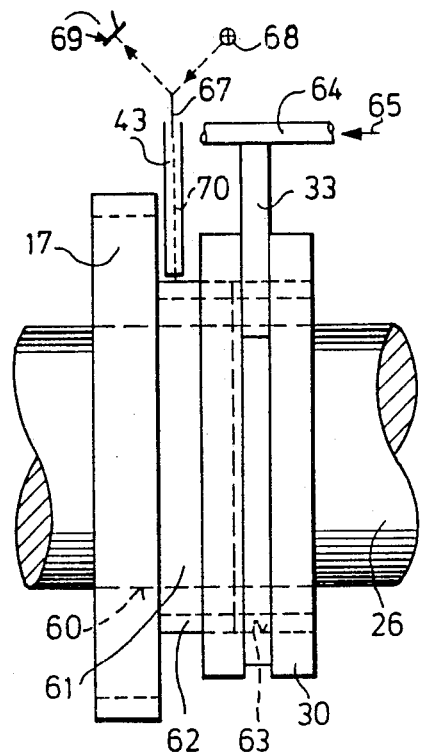
Fig. 2
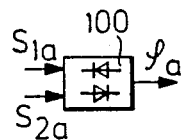
Fig. 5
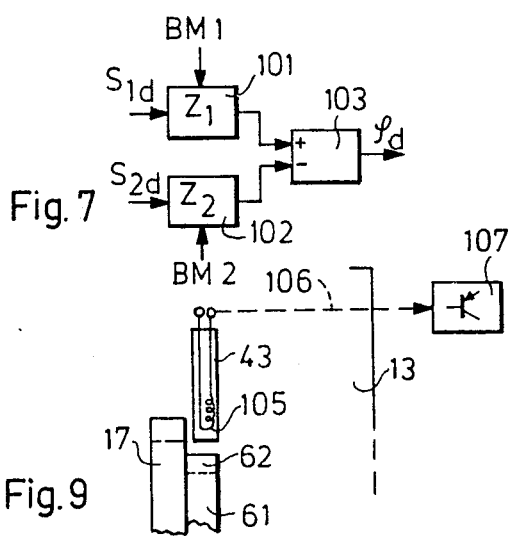
Fig. 7
Fig. 9

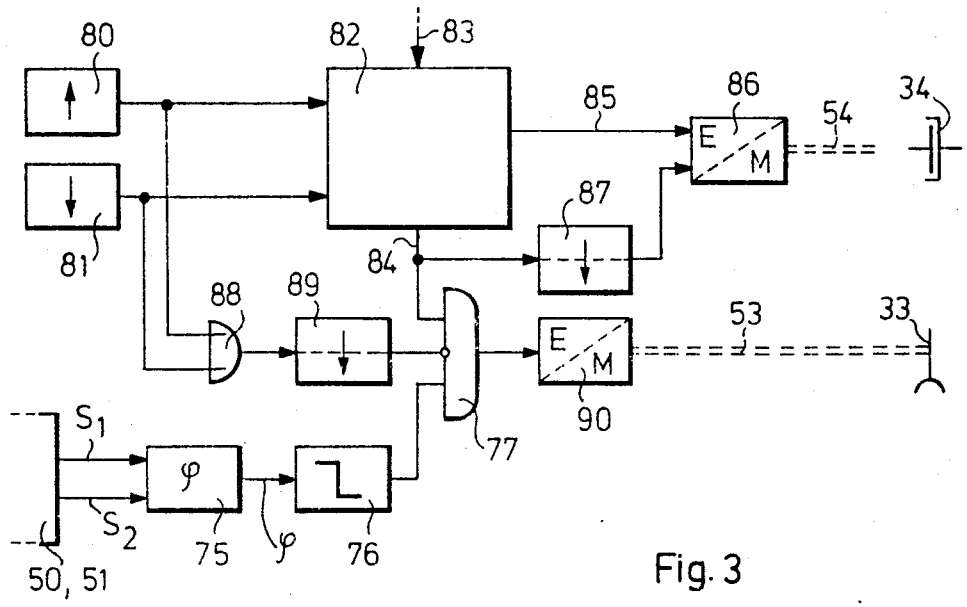
Fig. 3
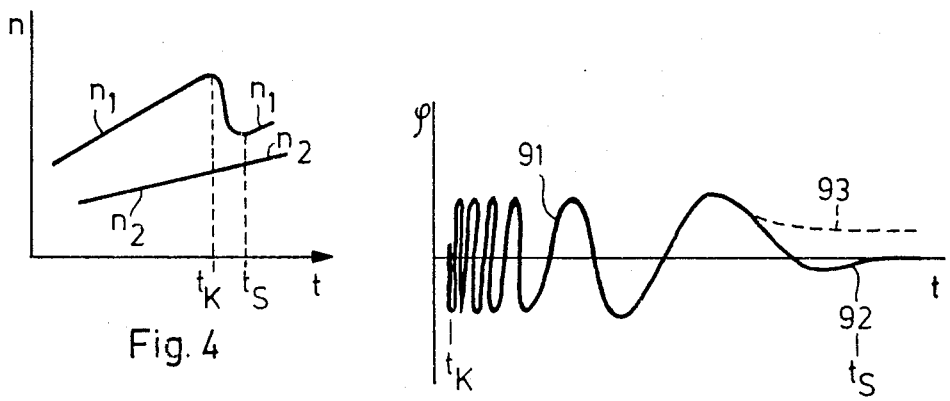
Fig. 4
Fig. 6
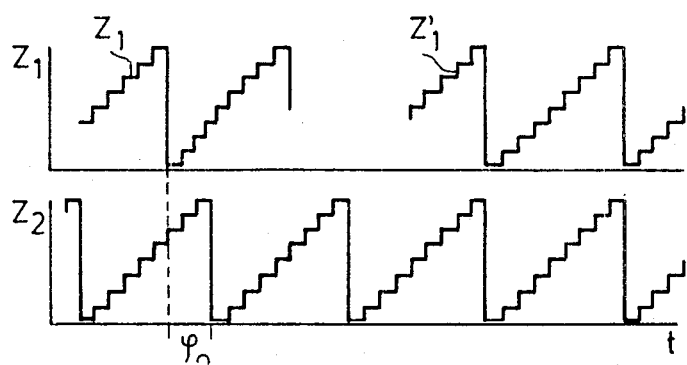
Fig. 8

GEAR-SHIFT MECHANISM FOR MOTOR-VEHICLE MULTI-STEP TRANSMISSIONS WITH INTERRUPTION OF TRACTION

This is a continuation of application Ser. No. 879,986 filed June 30, 1986, now abandoned.

The present invention relates to a gear-shift mechanism for motor-vehicle multi-step transmissions with interruption of traction in which transmission steps can be connected, via form-locking elements, into the flux of force between a drive shaft and a power take-off shaft of the transmission, comprising manual control switches connected to a control unit which actuates the form-locking means via servo systems, and comprising further sensors coacting with rotating marks on the power take-off shaft and on other rotating parts of the transmission, and shifting means which derive from the signals of the sensors a point of synchronism of the transmission and, when the said point is reached, cause the form-locking elements of the speed to be engaged to close.

Gear-shift mechanisms of this type have been known before and are generally described as "semi-automatic transmissions". The transmission in such arrangements is a manually operated mechanical motor-vehicle transmission and generally designed in such a manner that the drive shaft drives a countershaft carrying a plurality of gears. The latter are constantly in engagement with a corresponding number of gears on the power take-off shaft which are, however, not fixed against rotation. Closing of the flux of force between the drive shaft and the power take-off shaft is effected by gear-shift sleeves arranged on the power take-off shaft in a manner such that hey are fixed against rotation on the shaft while being capable of moving in the longitudinal direction. Depending on the speed to be engaged, a specific gear-shift sleeve is brought into form-locking engagement, by means of a shift fork, with the corresponding gear of the power take-off shaft whereby this gear is connected to rotate with the power take-off shaft so that the transmission then embodies the transmission step defined by this gear and the mating gear of the countershaft.

During gear change, i.e. during the time between disengagement of the former gear and engagement of the new gear, the flux of force between the drive shaft and the power take-off shaft is interrupted. One therefore describes such transmissions as transmission with interruption of traction, as compared with fully-automatic transmissions which usually are designed as planetary transmissions and where the clutches and/or brake bands of the individual steps are actuated in overlapping time sequence so that no interruption of traction occurs.

Mechanical transmissions with interruption of traction have a much simpler structure and are, thus, cheaper to produce than fully-automatic transmissions without such interruption of traction. In addition, mechanical transmissions are generally free from slip, while fully-automatic transmissions without interruption of traction require a hydraulic torque converter which ensures smooth gear changing in the starting phase and during shifting but which for this purpose necessarily must exhibit a certain slip. It is true that it has been known before to reduce such slip losses by means of a so-called converter lockup clutch, but such a clutch only leads to an even further increase of the costs involved.

In summary, it must, therefore, be said that mechanical transmissions with interruption of traction can be produced at considerably lower cost and lead normally to lower fuel consumption as well.

In the case of the before-mentioned known gear-shift mechanisms, one normally used a usual transmission without any change, except that the movements of the gear-shift lever that would normally have been performed by the driver were imitated by servo systems in conformity with the given shifting gate. In some cases, another servo system served to disengage the clutch between the engine and the transmission before disengaging the former gear and to engage it again after engagement of the new gear.

The speed was selected either in the conventional manner, using a gear-shift lever which now, however, did not act directly on the transmission but rather on a control device. However, there have also be known other gear-shift mechanisms in which the speed was selected automatically, i.e. usually as a function of the speed of the motor vehicle and the load impressed by the foot pedal. Combinations of these two forms of control have also been known. In these cases normally the speed is selected automatically, while additional manual means are provided for free selection of the speeds, if this should be desired.

Since—as mentioned before—one normally used commercially available transmissions for such semi-automatic transmissions, the synchronization of the elements that had to be brought into engagement for the new speed was effected in the conventional manner, too, i.e. by means of synchronizing rings acting between the gear-shift sleeves and the mating toothing of the respective gear. Synchronizing rings equalize the speeds of the elements by braking them correspondingly and ensure by means of so-called locking synchronization that the elements can be brought into engagement only when they rotate at approximately identical speeds.

According to a different known method, the speed conditions of the elements to be brought into engagement were recorded and monitored by measuring the speeds at the input and the output of the transmission and calculating the actual speeds of the elements to be brought into engagement on the basis of the transmission steps. The shifting elements were then engaged only when an approximate equality of speeds was reached, for example also be braking down that element that rotated at a higher speed.

However, determining the speed conditions existing in the transmission from auxiliary values picked up at the input and output of the transmission is a relatively unreliable procedure and permits the point at which the elements to be engaged rotate at equal speeds to be determined only very approximately. In any case, it is not possible in this manner to determine the exact position of the elements relative to each other. This is true for the absolute angular position of specific teeth relative to each other—angular in the case of toothings to be brought into engagement—and also quite generally for that position of the elements in which any teeth occupy a position exactly opposite any tooth gaps. This situation necessarily leads to the result that in the presence of a—though very small—differential speed the elements hit upon each other during shifting which in turn leads to heavy strain on the tooth flanks and an initially undefined form-locking engagement between the elements. This undefined form-locking engagement results in turn in undefined shifting times because the time required for bringing about the engagement is dependent on the accidental initial positions of the gears, and this in turn is a function of internal influences, such as the temperature of the transmission oil. The undefined shifting times in turn required that an automated clutch had to be be designed for the longest possible shifting time if one did not wish to accept again unreasonably high expenses for means permitting the shifting conditions to be monitored exactly.

All in all, the resulting shifting times therefore have to be very long, and this may give rise to problems, in particular when shifting up under traction, for example when accelerating on a slope.

Now, it is the object of the present invention to improve a gear-shift mechanism of the type described above in such a manner that the form-locking gear-shift elements are threaded into each other ideally so that the highest possible degree of shifting ease is achieved, combined with very short shifting times.

This object is achieved according to the invention by the fact that the said additional sensors coact with marks on the form-locking elements driven by the drive shaft, and that the shifting means determine the phase position between these elements and the power take-off shaft and cause the form-locking elements to close when a pre-determined phase position is reached.

The invention thus solves the underlying problem fully and perfectly because in this case, contrary to the conditions prevailing in the known gear-shift mechanisms, the shifting moment is not determined by a specific differential speed, but rather by an exact differential angular position of the gear-shift elements, preferably the differential position zero.

In this manner, it has become possible for the first time not only to bring the gear-shift elements into engagement in a defined rotary position relative to each other, i.e. in a position in which defined teeth engage defined tooth gaps, but in addition to ensure that when the gear-shift elements close, the teeth come to engage the matching tooth gaps exactly without first hitting upon the teeth of the other gear and sliding along their flanks before they finally come into proper engagement.

The gear-shift mechanism according to the invention therefore is the first to permit absolutely controlled synchronization with exact form-locking engagement at an ideal selected point of synchronization.

The invention is particularly well suited for conventional transmissions which are characterized by the fact that the form-locking elements take the form of gear-shift sleeves and toothings of gears forming the individual steps of the transmission, which are jointly arranged on the power take-off shaft, the gear-shift sleeves being fixed to the power take-off shaft to rotate therewith while the gears turn loosely on the power take-off shaft and are constantly driven by the drive shaft.

It goes, however, without saying that the gear-shift mechanism according to the invention is also suited for use with other types of transmission, such as double-clutch transmissions or the like.

In one embodiment of the invention using a conventional transmission as described above, the toothings are external toothings and the additional sensors coact with the said external toothings.

This feature provides the advantage that the sensors can coact with the toothings in a simple manner from the outside and that the sensors used may be of the types known generally in the motor vehicle field for detecting speeds, for example in connection with ignition systems, controls of fully-automatic transmissions and antiblock systems.

According to another embodiment of the invention, the signals of the sensors are supplied to a phase detector whose output is connected to a comparator.

If the comparator is a zero detector and/or a 180° detector, then this method permits in a particularly easy manner that condition to be detected in which the two elements to be brought into engagement with each other do not only exhibit the differential speed zero, but correspond in addition to a pre-determined angular position corresponding to a predetermined desired position.

According to a further improvement of this embodiment of the invention; the signals are analog signals and the phase detector is a mixer.

This design offers the advantage to permit exact recognition of a condition in which any teeth are located exactly opposite any tooth gaps.

According to another improvement of the same embodiment of the invention, the marks on the power take-off shaft and on the form-locking elements comprise each a reference mark, the signals are digital signals, and the phase detector comprises counters operating in synchronism with the reference marks and a subtractor stage.

This design provides the advantage that the teeth of the one element can be positioned exactly relative to the tooth gaps of the other element and that, in addition, the reference marks permit the angular positions of the two elements to be related to each other in such a manner that a specific tooth is positioned exactly opposite a specific tooth gap. The fact that a reference mark passes the sensors several times offers the additional advantage that any counting errors that may result from erroneous measurements of the sensors are compensated after each full rotation of the toothed rim because the system is calibrated anew every time a reference mark passes by.

According to a preferred embodiment of the invention, the additional sensors comprise a fiber-optical light guide for projecting a beam upon the marks of the form-locking elements and receiving a beam reflected by the said marks.

This embodiment provides the particular advantage that the fiber-optical light guides, which in this case have to be positioned only near the transmission, are particularly resistant against environmental influences, such as the high temperatures that may arise in the transmission oil. In addition, it has been found that provided such fiber-optical light guides are sized appropriately and that the spectral range of the light is selected conveniently, such fiber-optical light guides are even capable of operating under the oil mist conditions normally encountered in the transmission case during operation of the transmission.

According to still another embodiment of the invention, the additional sensors comprise a coil whose electric evaluation system is arranged at a distance from the said sensors.

This feature provides the advantage that induction sensors of the type that have proved their value in connection with toothed rims in the motor-vehicle industry can be used alternatively to the before-mentioned fiber-optical light guides, in which case the arrangement of the electronical evaluation system outside the transmission case or at least at an effective distance from the sensors ensures that the high temperature of the transmission oil cannot affect the elements of the electronic evaluation system negatively.

Finally, still another embodiment of the invention is preferred in which two hand-operated control switches are provided for shifting the transmission up or down, respectively, by one step and in which the control unit reads out the step to be engaged at any given time from a ring counter.

This feature provides the advantage of increased operating ease, as compared with the manual transmission permitting free selection of the desired speed, because signals corresponding to the driving conditions given at any time are sufficient to shift the transmission up or down. As compared to fully-automatic systems, this arrangement provides the advantage of considerably reduced constructional input because there is no need to pick up any vehicle parameters, such as the load or the vehicle speed.

Other advantages of the invention will appear from the following specification and the attached drawing.

Some embodiments of the invention will be described hereafter in greater detail with reference to the drawing in which:

FIG. 2 shows an enlarged partial view of FIG. 1, illustrating the arrangement of the sensors;

FIG. 3 is a block diagram of one embodiment of an electronic control according to the invention;

FIG. 4 shows a speed curve plotted as a function of time, for further explanation of the block diagram of FIG. 3;

FIG. 5 shows one embodiment of a phase detector for analog signals;

FIG. 6 shows a curve of the phase relation as a function of time, for further explanation of the block diagram of FIG. 5;

FIG. 7 shows one embodiment of a phase detector for digital signals;

FIG. 8 shows the development of the counter readings as a function of time, for further explanation of the diagram of FIG. 7;

FIG. 9 is a diagrammatic representation of an induction sensor of the type suited for use in connection with the present invention.

Figure 1:
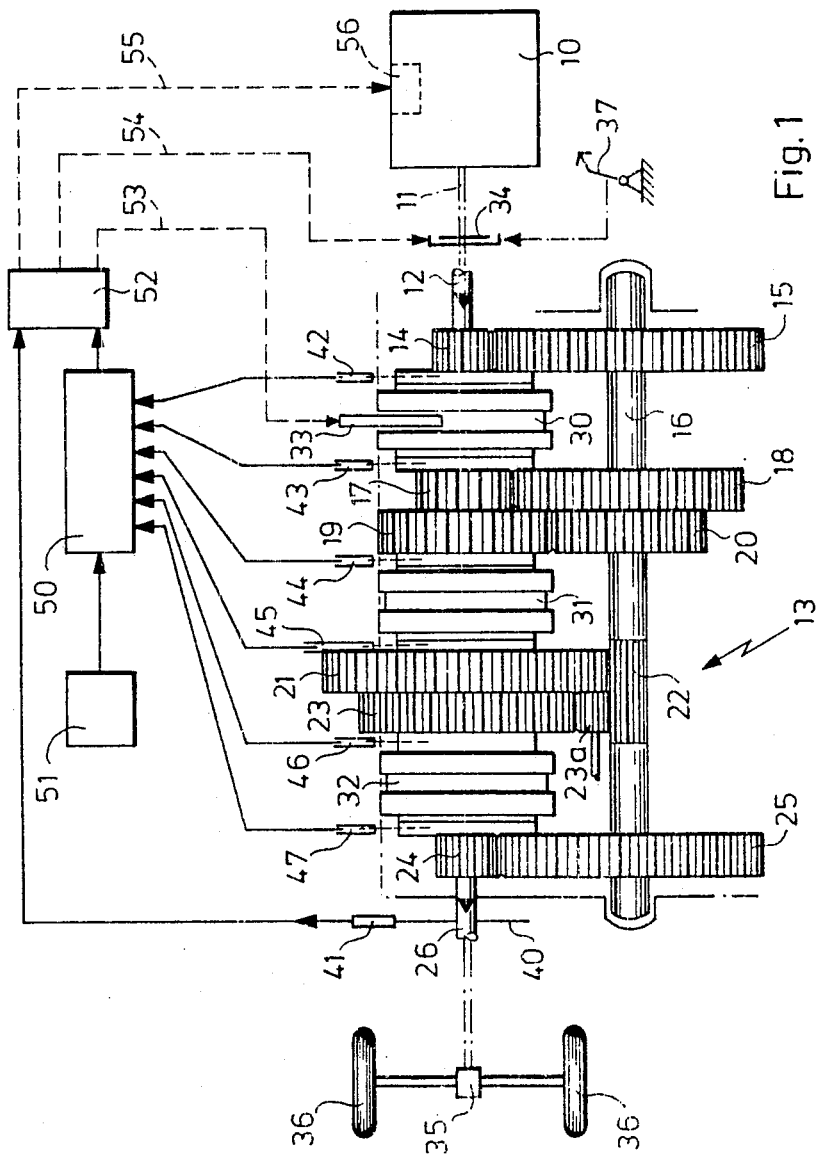
FIG. 1 shows a diagrammatic overall view of one embodiment of a gear-shift mechanism according to the invention.

In FIG. 1, reference numeral 10 designates the engine of a motor vehicle comprising an engine shaft 11. The engine shaft 11 is connected with a drive shaft 12 of a transmission designated by reference numeral 13. The transmission 13 is one of conventional design comprising a first pair of gears 14, 15 for the fourth, direct speed, the gear 14, which is in meshing engagement with the gear 15, being seated on a countershaft 16. Further pairs of gears 17, 18 for the third speed, 19, 20 for the second speed, 21, 22 for the first speed, 23, 23a, 22 for the reverse gear and 24, 25 for the fifth speed are arranged on a power take-off shaft 26 and the countershaft 16. Reference numeral 22 indicates a toothing of the countershaft 16, 11.

Between the pairs of gears 14/15 and 17/18 there can be seen a double-sided gearshift sleeve 30, while additional gearshift sleeves 31, and 32 are provided between the pairs of gears 19/20 and 21/22, and 23/22 and 24/25, respectively.

All gears 15, 18, 20, 25 and toothings 22 of the countershaft 16 are fixed to the latter in the known manner, and the gears 17, 19, 21, 23 and 24 turn loosely on the power take-off shaft 26. The gearshift sleeves 30, 31, 32 are fixed to the power take-off shaft 26 to rotate therewith, but capable of sliding along the latter in the axial direction. The gearshift sleeves 30, 31, 32 are displaced laterally by shift forks. One of such shift forks is indicated by reference numeral 33 at the gearshift sleeve 30. The gearshift sleeves 30, 31, 32 can be connected with one of the gears 14, 17, 19, 21, 23, 24 via suitable form-locking arrangements, in particular toothed rims, so that any one of the gears can be connected with the power take-off shaft 26 to rotate therewith, whereby the transmission 13 is set to a particular transmission step.

Between the engine shaft 11 and the drive shaft 12 of the transmission 13, there is provided a clutch 34 which can be actuated either in the conventional manner via a clutch pedal 37 or else automatically, as will be described further below.

The power take-off shaft 26 is connected with a differential gear 35 moving driving gears 36 of the motor vehicle.

These features are known as such and not part of the object of the present invention.

The power take-off shaft 26 carries a toothed disk 40 coacting with a power take-off sensor 41. Additional gear sensors 42, 43, 44, 45, 46 and 47 coact with elements of the transmission 13 which are driven by the drive shaft 12, as will be described further below.

The sensors 41 to 47 coact with marks provided on the disk 40 and on the before-mentioned elements. In the meaning of the present invention, the term marks is meant to describe any form of possible discontinuity, such as teeth, slots, magnetic inserts, light reflectors, or the like.

The gear sensors 42 to 47 are connected with a de-multiplexer 50 which is controlled by a speed-selector unit 51. The speed-selector unit 51 selects the signal of one of the gear sensors, in response to the prevailing speed command, and supplies this signal to an evaluator unit 52 which is in addition supplied with the signal of the power take-off sensor 41. A first output line 53 of the evaluator unit 52 serves to actuate the shift forks which in FIG. 1 are represented by way of example by a shift fork 33; a second output line 54 may, if required, control the clutch 34, and a third output line 55 may act upon the engine control, for example an injection pump or a carburetor of the driving engine 10.

FIG. 2 shows in greater detail that the gear 17 is mounted in a seat 60 to turn loosely on the power take-off shaft 26. Since all gears 5, 18, 20, 22, 25 of the countershaft 16 are driven constantly by the drive shaft 12 via the gear 14 and all gears of the transmission 13 are in meshing engagement with each other in the manner illustrated by FIG. 1, the gear 17 will turn on the power take-off shaft 26 loosely as long as the third speed remains disengaged.

The gear 17 is provided on that side which faces the gearshift sleeve 30 with a projection in the form of a power transmission gear 61 provided with an external toothing 62. The external toothing 62 is designed to match an internal toothing 63 of the gearshift sleeve 30., the gearshift sleeve 30 being seated—as mentioned before—to rotate with the power take-off shaft 26 and to move in the axial direction thereof. Now, if the gearshift sleeve 30 is deflected to the left by means of the shift fork 35 and, if required, a rod 64 in the direction of arrow 65 in FIG. 2 when the third speed is to be engaged, then the toothing 62 comes into engagement with the internal toothing 63 and the gear 17 is coupled to the power take-off shaft 26 to rotate therewith.

In order to determine a condition of the gear 17 and the gearshift sleeve 30 which is particularly favorable for closing the flux of force between the toothings 62 and 63, the rotation of the gearshift sleeve 30, which as said before is connected with the power take-off shaft 26 to rotate therewith, is picked up by the power take-off sensor 41 while the rotation of the gear 17 is picked up by the gear sensor 43 coacting with the external toothing 62.

It is the object of the invention to ensure a shifting operation which guarantees that the meshing engagement between the external toothing 62 and the internal toothing 63 is established in the best possible manner.

This can be achieved according to the invention by means of a control of the type depicted by the block diagram of FIG. 3.

The elements 50, 51 supply two signals $S_1$, $S_2$ to the control unit, namely the signal of the power take-off sensor 41 and, depending on the speed to be engaged, the signal of that gear sensor 42 to 47 which corresponds to the speed to be engaged. The signals $S_1$, $S_2$ are received by a phase detector 75 whose output is supplied with a signal $\phi$ corresponding to the phase relationship between the signals $S_1$ and $S_2$. The signal $\phi$ is supplied to a comparator which in the embodiment shown takes the form of a zero detector 76. Accordingly, a signals appears at the output of the zero detector 76 when the two signals $S_1$, $S_2$ are absolutely in or out of phase, i.e. when $\phi=0$ or $\phi=180°$. At this moment, a positive logic signal is emitted by the output of the zero detector 76 and supplied to the input of an AND gate 77. In the embodiment represented in FIG. 3, the driver controls the transmission via a first manual control switch 80 when shifting up, and via a second manual control switch 81 when shifting down. Additional control switches may be provided for a neutral position, a parking position, or the reverse gear; however, these switches have been omitted in FIG. 3 for the sake of clarity. The signals of the switches 80, 81 are supplied to a control unit 42 which may be supplied also with other control signals via inputs 83, arriving for example from the other switches described before. For defining the speed that is to be engaged at any moment, the control unit 82 may be provided with a ring counter which adds or subtracts one position every time the switch 80 or 81 is operated.

A first output 84 of the control unit 82 is connected with a further input of the AND gate 77. A second output 85 leads to an electro-mechanical converter, i.e. a servo mechanism 86. A delay element for controlling the clutch 34 is connected between the first output 84 and an additional input of the servo mechanism 86.

The outputs of the manual control switches 80, 81 are connected with an OR gate 88 controlling another delay element 81 which is connected to a third inverted input of the AND gate 77. The AND gate 77 controls another servo mechanism 90 which actuates the shift forks, for example the shift fork 33.

The operation of the system according to the invention will now be described with reference to FIGS. 1 to 4, by way of a shifting-up process under traction, from the second into the third speed.

In FIG. 4, the speeds n, i.e. the speed $n_1$ of the drive shaft 12 and the speed $n_2$ of the power take-off shaft 26 are plotted as a function of the time t. The vehicle is accelerated in the lower gear until the moment $t_K$ when the driver wishes to shift up from the second into the third speed. The driver actuates for this purpose the first manual control switch 80. The control unit 82 generates at the second output 85 a control command for the servo mechanism 86 whereby the clutch 34 is disengaged via the second output line 54.

It is, however, understood that according to a variant of the invention the clutch 34 may also be actuated in the conventional manner, via the foot pedal 37.

As long as the second speed was engaged, a positive logic signal appeared at the output of the zero detector 76 because the gear 19 turned in synchronism with the gearshift sleeve 31. For this reason, cutting through of the AND gate 77 is initially blocked for a short time via the OR gate 88 and the delay element 89 as well as the inverting input of the AND gate 77. This blocking remains effective until, after disengagement of the clutch 34, the elements of the second speed, i.e. the gearshift sleeve 31 and the gear 19 are also disengaged because then the elements 31/19 of the former gear and the elements 17/30 of the new gear as well rotate out of synchronism, and the output of the zero detector 76 is supplied with a negative logic signal also when the demultiplexer 50 is switched over to the new speed.

As can be seen in FIG. 4, the driving speed $n_1$ of the transmission drops after disengagement of the clutch 34 at the moment $t_K$—a process which can be accelerated by influencing the motor control 56 via the third output 55.

The speeds $n_1$, $n_2$ then adjust themselves to a relation corresponding to the transmission ratio of the gears 17, 18 in the third speed. When this condition is reached at the moment $t_S$ in FIG. 4, the phase detector 75 comprising the zero detector 76—the operation of which will be described in greater detail below—recognizes that the phase relation, for example $\phi=0$ or $\phi=180°$, exists at a given moment in time. This means that the toothings 62, 63 face each other in a pre-determined relationship.

If the design of the control is such that a separate AND gate 77 is available for each speed, then the control unit has supplied before, via a second output 84 which may correspond to a second storage position of the ring counter, a positive logic triggering signal for the respective speed, in the present example the third speed, so that upon arrival of the positive logic signal from the zero detector 76, the AND gate 77 is now connected through because the retarding time of the delay element has lapsed before. Now, the shift fork 33 is actuated via the servo system 90 and the first output line 53, and the power transmission gear 61 is brought into engagement with the gearshift sleeve 30 at the ideal point in time, as described before.

The delay element 87 whose dwelling time has been selected to cover all shifting times that may arise in practical operation, now activates the servo system 86 so that the clutch 34 is engaged again via the second output line 54.

This completes the shifting operation.

It goes without saying that the logic circuit arrangement shown in FIG. 3 is meant as an example only and that the same logic sequence can be implemented in the known manner using other logic networks.

In the following, the operation of the phase detector 75 will be described by way of two embodiments of the invention.

FIG. 5 shows a phase detector for analog signals $S_{1a}$ and $S_{2a}$ in the form of a mixer 100. At the moment when the new speed is engaged, the shape of the analog output signal $\phi_a$ is as in FIG. 6. It can be seen that at the shown diagrammatically moment $t_K$ the periodic phase curve corresponds to the differential speed. Thereafter, the curve assumes gradually the shape of a d.c. curve, as the differential speed approaches zero. When the toothed rims 62 and 63 are in a pre-determined phase relationship, the curve 92 approaches the final value zero. This is the preferred case of the present invention in which the toothed rims 62, 63 are brought into engagement at the moment $t_S$. In the case of known arrangements which respond only to the speed difference, the curve 63 may also exhibit a final value not equal to zero in which case the toothed rims 62, 63 do no longer rotate relative to each other, but remain in a rotary position different from the desired position.

FIG. 7 shows another embodiment of a phase detector for digital input signals $S_{1d}$, $S_{2d}$. The digital input signals $S_{1d}$, $S_{2d}$ are supplied to counters 101, 102 which are synchronized by reference marks BM 1 or BM 2. The reference marks may in the conventional manner take the form of teeth of different shape in toothed rims, reference pins in the neighborhood of a specific tooth of a gear, or the like. The counter readings of the counters 101, 102 are supplied to a subtractor stage 103, the output of which emits the digital phase signal $\phi_d$.

In FIG. 8, the counter readings $Z_1$, $Z_2$ are plotted as a function of the time t. It can be seen in the left half of FIG. 8 that although the counters $Z_1$, $Z_2$ count with the same graduation and up the same final value, because the toothings 62, 63 are identical in shape, the counters 101, 102 are out of phase, i.e. shifted by a differential value $\phi_0$. This case corresponds to the curve 93 in FIG. 6 identical, their relative rotary positions are not. Only in the right half of FIG. 8, when the counter reading is $Z_1$, the condition is reached where both toothings 62, 63 rotate in synchronism as to speed and phase, so that the gear can be engaged in accordance with the invention.

From the above explanations it appears also that the analog phase detector shown in FIGS. 5 and 6 is capable of detecting a defined relative phase position between teeth and tooth gaps of the toothings 62, 63, but incapable of recognizing which particular tooth is positioned opposite which particular gap. As compared to this, the digital phase detector shown in FIGS. 7 and 8 goes one step further insofar as it is capable of recognizing in addition the point where the toothings 62, 63 occupy a pre-determined position relative to each other as regards their reference marks and, thus, relative to each individual tooth.

The ideal point of synchronism is reached in the present invention when—specific—teeth are positioned exactly opposite—specific—tooth gaps, i.e. when the signals $S_1$, $S_2$ are out of phase by 180°. When the toothed disk 40 and the toothing 62 are provided with appropriate marks, it is, however, also possible without any problems to displace the sensor 41 angularly by half a tooth pitch relative to all other sensors 42 to 47 so that the signals $S_1$, $S_2$ are exactly in phase at the point of synchronization.

The sensors used for the purposes of the present invention may operate according to different principles.

The embodiment of the gear sensor 43 shown in FIG. 2 uses a fiber-optical light guide 67 connected in the one direction with a light source 68 and in the opposite direction with the photo-sensitive element 69. The light source 86 emits a light beam 70 which is projected upon the external toothing 62 of the power transmission gear 61. From there, the light beam 70 is reflected upon the photo-sensitive element 69, the reflection process being modulated by the external toothing 62.

According to a different embodiment of the invention as shown in FIG. 9, the sensor 43 comprises an induction coil 105 whose inductivity is modulated by the external toothing 62. The signal of the sensor 43 is supplied via a line 106 to an electronic evaluator unit 107 which is arranged conveniently outside the transmission 13 where it is protected from exposure to the high temperatures of the transmission oil.

We claim:
1. An electronically controlled multi-ratio power transmission for a motor vehicle powered by a combustion engine and having driven wheels, comprising:
   a drive shaft;
   a clutch for connecting said combustion engine to said drive shaft;
   an output shaft connected to said driven wheels of said motor vehicle;
   a countershaft;
   a pair of toothed wheels meshing with each other and arranged on said driven shaft and said countershaft respectively to continuously drive said countershaft in synchronism with said drive shaft;
   a first set of toothed wheels arranged freely rotatable on said output shaft, said toothed wheels of said first set having a peripheral toothing and being each provided with a radial projection carrying a circumferential external toothing;
   a second set of toothed wheels arranged on said countershaft to rigidly rotate therewith and having a peripheral toothing, one each of said toothed wheels of said first set continuously meshing with one each of said toothed wheels of said second set by way of engagement of said peripheral toothings;
   gear shift sleeves arranged on said output shaft to rigidly rotate therewith, said sleeves being axially displaceable on said output shaft and carrying each a circumferential internal toothing, complementary to said external toothing of said projections of said toothed wheels of said first set and being arranged adjacent thereto;
   means for selectively axially displacing one of said sleeve to being said internal toothing of said one sleeve into engagement with said external toothing of said projection of said adjacent toothed wheel;
   a disk rotating in synchronism with said output shaft and carrying markers;
   a first stationary sensor sensing said markers and operable to generate a first periodic signal having a frequency indicative of the rotational speed of said output shaft;
   a set of second stationary sensors sensing said external toothing of said toothed wheels of said first set and operable to generate second periodical signals having a frequency indicative of the rotational speed of said toothed wheels of said first set;
   phase-detection means having inputs coupled to said first sensor and said second sensors to compare said first periodical signal with one each of said second periodical signals, said phase-detection means having an output;
   a threshold-stage coupled to said output of phase-detection means, said threshold-stage generating a third signal when said internal toothing of said one sleeve and said external toothing of said projection of said adjacent toothed wheel are at a predetermined relative angular position;

manual control switch means for preselecting a transmission ratio; and actuating means selected by said manual control switch means for axially displacing said one sleeve to effect engagement of said internal and said external toothings upon generation of said third signal.

2. The transmission of claim 1, wherein said first and second signals are analog signals and said phase-detection means comprises a mixer.

3. The transmission of claim 1, wherein said sensors each comprises a fiber-optical light guide for projecting a light beam upon said markers and said external toothing respectively, and for receiving a beam reflected by said markers and said external toothing respectively.

4. The transmission of claim 1, wherein said switch means comprises:

a first manual control switch for effecting shifting to a next higher transmission ratio;

a second manual control switch for effecting shifting to a next lower transmission ratio;

a ring counter being counted up and down, respectively, under the action of said first and second manual control switches; and reading means for reading an preselected transmission ratio from said ring counter.

* * * * *